United States Patent
Stancu et al.

(10) Patent No.: US 12,015,356 B2
(45) Date of Patent: Jun. 18, 2024

(54) METHOD AND APPARATUS FOR ABSORPTION OF HIGH ENERGY LOAD FEEDBACK IN DEGAUSSING APPLICATIONS

(71) Applicant: L3Harris Technologies, Inc., Melbourne, FL (US)

(72) Inventors: Constantin Stancu, Anaheim, CA (US); Joaquin Gabriels, Anaheim, CA (US)

(73) Assignee: L3HARRIS TECHNOLOGIES, INC., Melbourne, FL (US)

( * ) Notice: Subject to any disclaimer, the term of this patent is extended or adjusted under 35 U.S.C. 154(b) by 453 days.

(21) Appl. No.: 17/466,598

(22) Filed: Sep. 3, 2021

(65) Prior Publication Data
US 2023/0072823 A1    Mar. 9, 2023

(51) Int. Cl.
*H02M 7/5387*    (2007.01)
*H02M 1/088*    (2006.01)
*H02M 1/32*    (2007.01)
*H02M 1/36*    (2007.01)

(52) U.S. Cl.
CPC ......... *H02M 7/5387* (2013.01); *H02M 1/088* (2013.01); *H02M 1/32* (2013.01); *H02M 1/36* (2013.01)

(58) Field of Classification Search
CPC .............................. H02M 1/36; H02M 7/5387
See application file for complete search history.

(56) References Cited

U.S. PATENT DOCUMENTS

| 5,168,195 A * | 12/1992 | Breidigan | H04N 9/29 |
| | | | 361/150 |
| 9,595,841 B2 * | 3/2017 | Shimada | H02M 1/32 |
| 10,171,004 B2 * | 1/2019 | Itoh | H02M 3/07 |

FOREIGN PATENT DOCUMENTS

JP    2018133964 A   *   8/2018

\* cited by examiner

*Primary Examiner* — Gary L Laxton
(74) *Attorney, Agent, or Firm* — Edell, Shapiro & Finnan, LLC (57) ABSTRACT

An apparatus includes a power converter having switches coupled to input voltage rails and to opposing terminals of a coil to be energized. The switches are configured to be turned ON or OFF to conduct or block current, respectively, responsive to switch control signals. The apparatus also includes a controller to generate the switch control signals to compel the power converter to selectively operate (i) in a normal mode in which the switches are periodically turned ON and OFF to supply current from the input voltage rails to the coil to energize the coil, and (ii) in a protection mode in which first switches are continuously turned ON, and second switches are continuously turned OFF, to interrupt the current, and to circulate an initial current, flowing in the coil when the protection mode is entered, through the power converter and the coil so that the initial current decays toward zero.

20 Claims, 12 Drawing Sheets

FIG.12
PRIOR ART

METHOD AND APPARATUS FOR ABSORPTION OF HIGH ENERGY LOAD FEEDBACK IN DEGAUSSING APPLICATIONS

TECHNICAL FIELD

The present disclosure relates to using a power converter to energize an inductor and to protect circuits against energy feedback from the inductor once energized.

BACKGROUND

Ship degaussing systems use power converters to energize large inductive coils that have the potential to store significant amounts of energy when energized. During shutdown of the power converters, potential energy in the energized coils feeds back into the power converters. The feedback energy can lead to degradation or permanent damage to the power converters if no absorption circuitry is incorporated to dissipate the energy. Conventional solutions employ large energy absorption circuitry external to the power converters that is significant in size, weight, and cost. Passive energy absorption circuitry uses Transient Voltage Suppression (TVS) diodes, which are simple but unreliable. Failure of the TVS diodes can result in significant damage to the power converters. Active energy absorption circuitry relies on a complex and unreliable active monitoring system to activate the circuitry, usually resistors, to convert the feedback energy to heat. Failure of any part of the energy absorption circuitry can result in significant damage to the power converters.

DESCRIPTION OF EXAMPLE EMBODIMENTS

Overview

In an embodiment, an apparatus includes a power converter having switches coupled to input voltage rails (which serve as an input source to the power converter) and to opposing terminals of a coil to be energized. The switches are configured to be turned ON or OFF to conduct or block current, respectively, responsive to switch control signals applied to the switches. The apparatus also includes a controller to generate the switch control signals to compel the power converter to selectively operate (i) in a normal mode in which the switches are periodically turned ON and OFF to supply current from the input voltage rails to the coil to energize the coil, and (ii) in a protection mode in which first switches of the switches are continuously turned ON, and second switches of the switches are continuously turned OFF, to interrupt the current from the input voltage rails, and to circulate an initial current, flowing in the coil when the protection mode is entered, through the power converter and the coil so that the initial current decays toward zero.

Example Embodiments

A prior art degaussing system is first described in connection with FIGS. 11 and 12. Then, embodiments presented herein will be described in connection with FIGS. 1-10.

Figure 11:
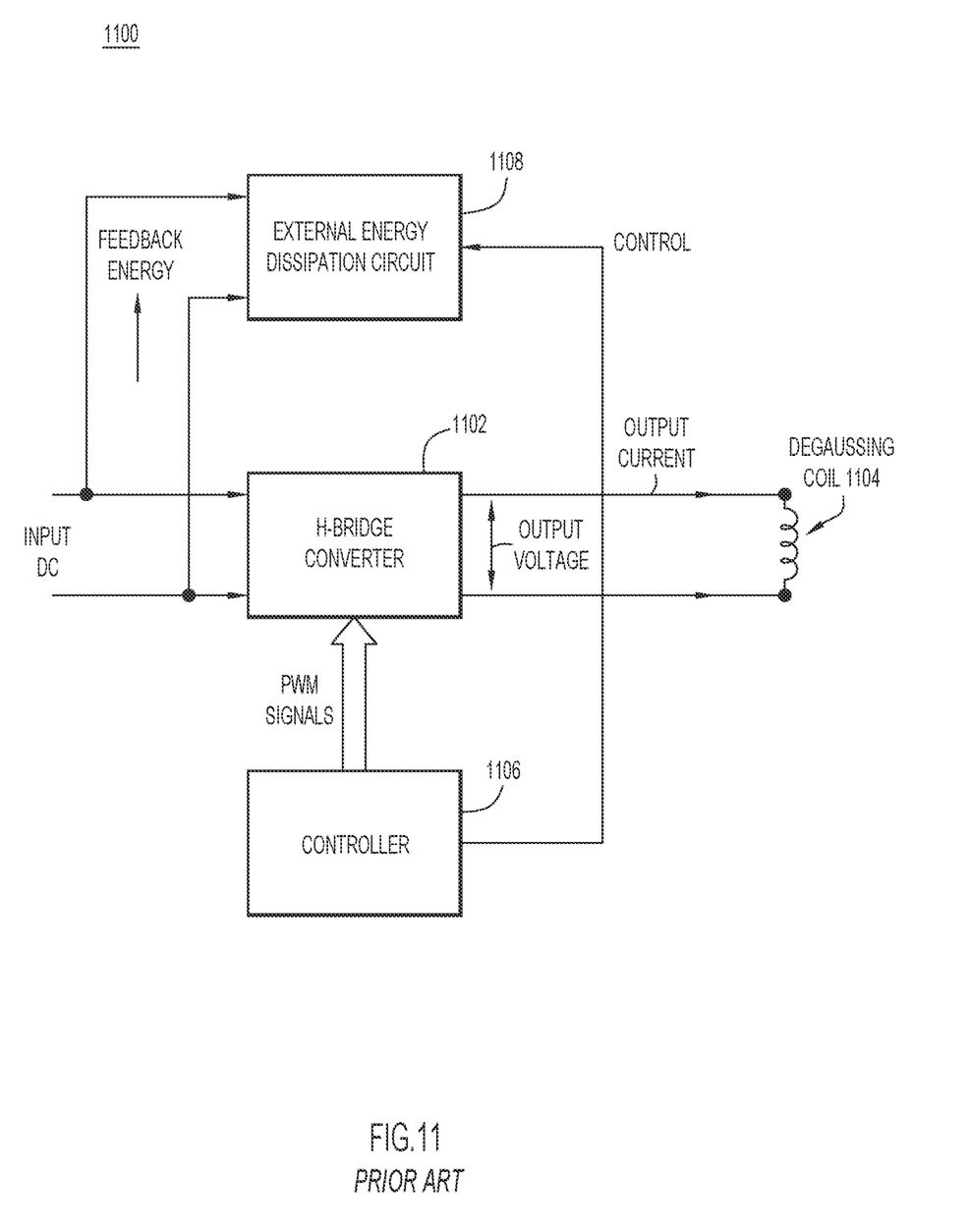
FIG. 11 is block diagram of a prior art degaussing system.

FIG. 11 is block diagram of a prior art degaussing system 1100, in which a direct current (DC)-to-alternating current (AC) (DC-AC) H-bridge converter 1102 converts DC input power to AC output power to energize a degaussing coil 1104 for a degaussing operation, responsive to square wave PWM signals generated by a controller 1106. When a fault or power-down condition occurs, controller 1106 asserts the PWM signals to constant levels to continuously turn OFF all current switches in the H-bridge converter, and activates external energy dissipation circuit 1108 to absorb feedback energy from energized degaussing coil 1104. As mentioned above, the external energy dissipation circuit 1108 is large, expensive, failure prone, and may not avoid overvoltage/overcurrent damage to other components.

Figure 12:
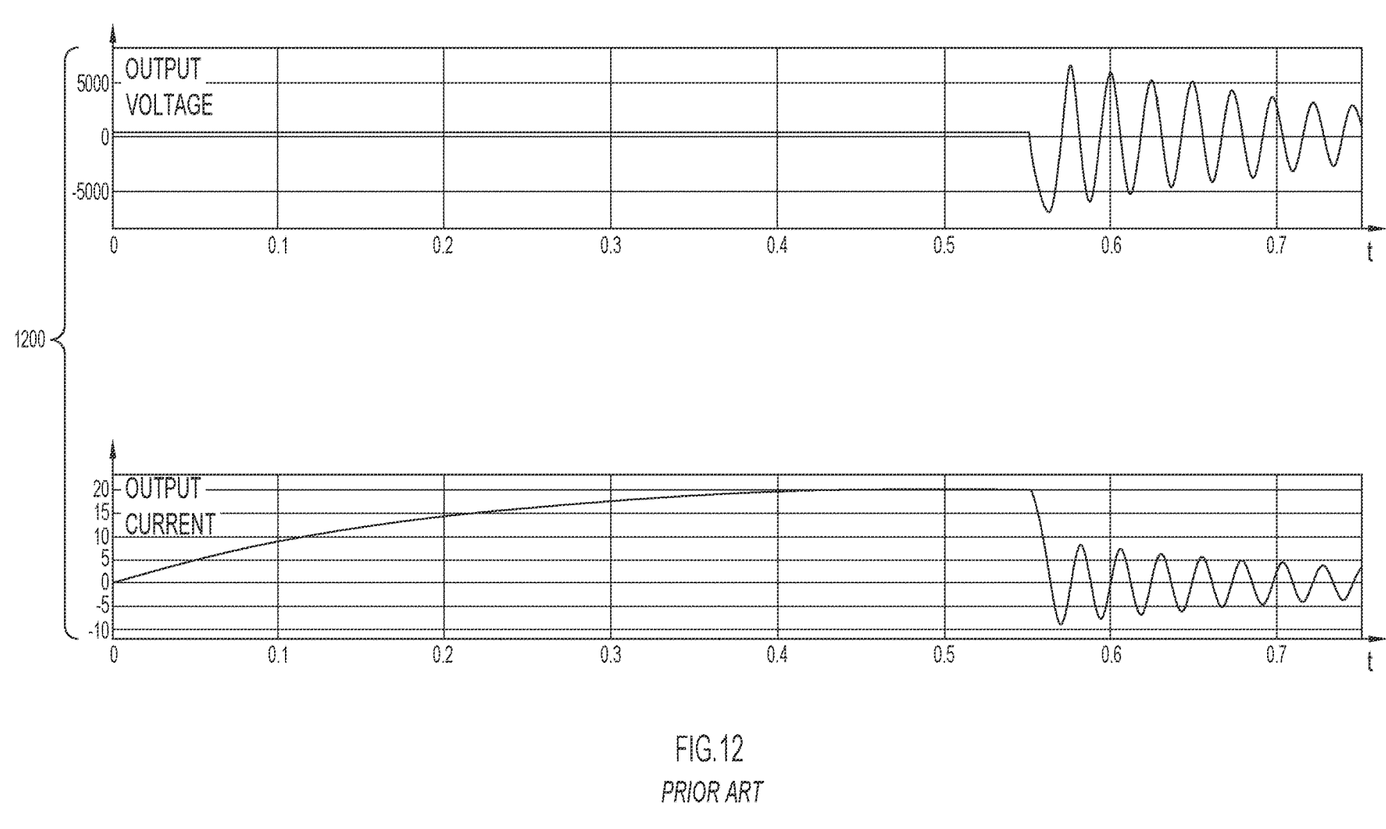
FIG. 12 shows prior art timing waveforms for output current (bottom waveform) and output voltage (top waveform) in the prior art degaussing system with an external energy dissipation circuit of the prior art degaussing system in a non-active state.

FIG. 12 shows prior art timing waveforms 1200 for output current (the bottom waveform) and output voltage (the top waveform) applied to degaussing coil 1104 (also referred to as the "coil") by H-bridge converter 1102 when the H-bridge converter operates normally, and then is shut down. The example of FIG. 12 assumes degaussing coil 1104 (also referred to as the "coil") has an inductance of 3 H and a resistance of 15Ω. The waveforms are depicted over the following successive time segments:

a. For t=0 to 0.43 seconds (s), H-bridge converter 1102 operates normally responsive to the square wave PWM signals from controller 1106 to impress an output voltage of 350 Vdc on the coil to bring the output current to 20A.

b. After t=0.43 s, H-bridge converter 1102 continues to operate normally.

c. At t=0.55 s, a presumed fault/power-down condition occurs and, consequently, controller 1106 asserts all of the PWM signals to constant levels to continuously turn OFF all current switches of the H-bridge converter. Initially, the high-level of energy stored in degaussing coil 1104 has nowhere to go. As a result, the output voltage (i.e., the coil voltage) quickly attains destructively high oscillating values, e.g., up to 7000V, which can damage components of system 1100. At this point, energy dissipation circuit 1108 needs to turn on and limit the voltage by transforming the coil energy into heat.

Accordingly, embodiments presented herein provide an improved degaussing system configured to safely absorb feedback energy from a degaussing coil when a fault/power-down condition occurs, in a manner that overcomes the above-mentioned disadvantages of conventional degaussing systems, and offers other advantages described below. The embodiments implement active energy absorption to dissipate the feedback energy directly through current switches of a power converter, without diverting the feedback energy into additional components, such as resistors, diodes, or other passive components that are external to the power converter. Thus, the embodiments obviate the need for the additional, external components (e.g., energy dissipation circuit 1108). The embodiments are described below in connection with FIGS. 1-10.

Figure 1:
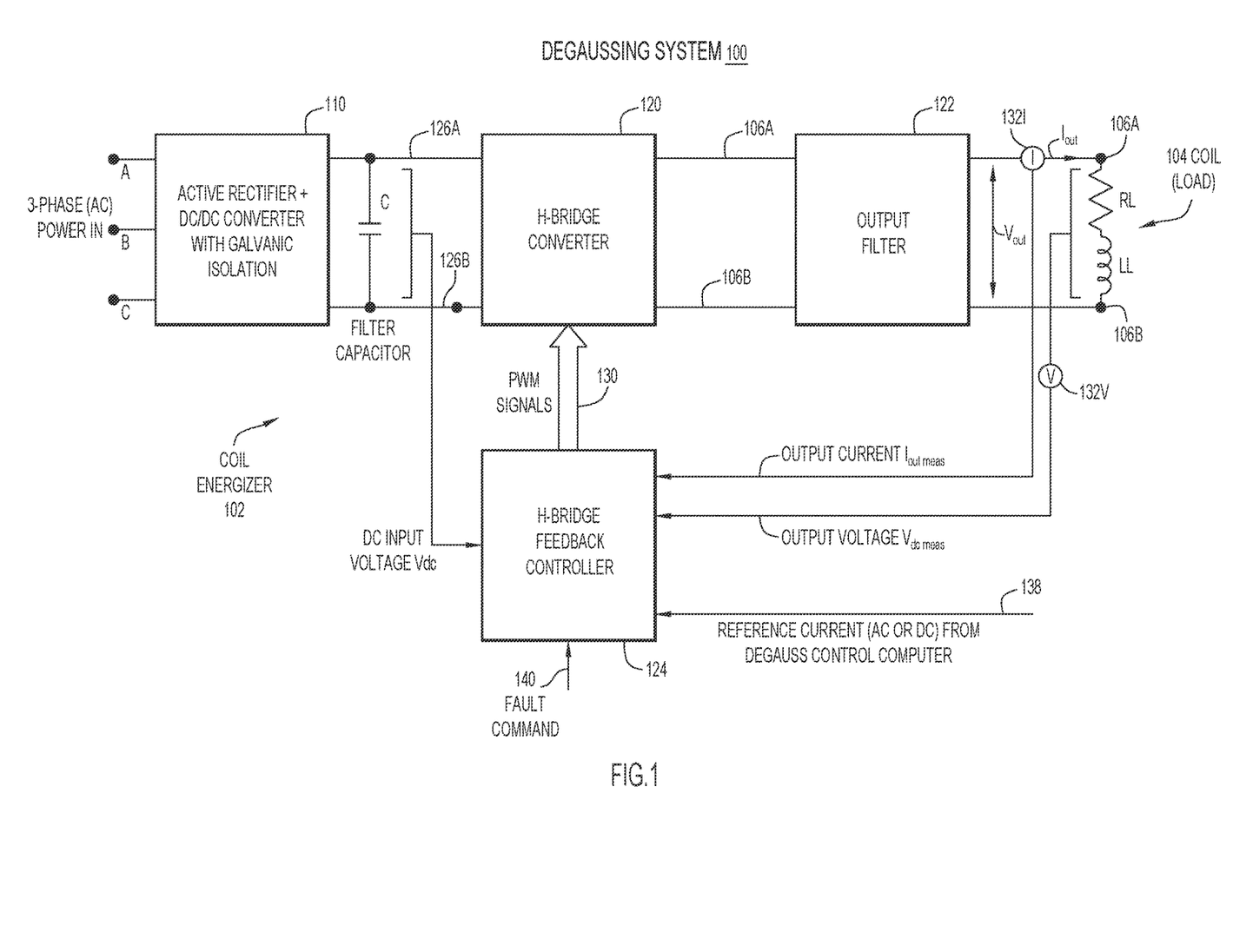
FIG. 1 is a block diagram of an example degaussing system in which energy load feedback in a degaussing application may be implemented.

FIG. 1 is a block diagram of an example degaussing system 100 in which energy load feedback in a degaussing application may be implemented. Degaussing system 100 includes a coil energizer 102 coupled to a degaussing coil 104 (also referred to simply as a "coil" 104). Degaussing coil 104 may be a high-inductance load, represented by a load inductor LL having an internal resistance RL. Degaussing coil 104 is applied to a system to be degaussed (not shown), such as a ship or other large body. Coil energizer 102 includes input terminals A, B, and C and opposing output terminals or output voltage rails 106A, 106B (collectively referred to as output terminals 106 or output voltage rails 106). The opposing output terminals/output voltage rails 106A, 106B are coupled to opposing sides of degaussing coil 104, as shown. Responsive to phases A, B, and C of 3-phase (AC) input power applied to respective input terminals A, B, and C, coil energizer 102 generates a low frequency (AC) output current Tout (e.g., a degaussing current) at output voltage rails 106, which flows into degaussing coil 104, which energizes the coils and generates a degaussing field to degauss the system to be degaussed.

Coil energizer 102 includes an active rectifier and DC-to-DC converter 110 (also referred to simply as a "rectifier-converter" 110) coupled to input terminals A, B, and, C, a filter capacitor C coupled to an output of the rectifier-converter, a power converter implemented as a DC-to-AC (DC-AC) H-bridge converter 120 coupled to capacitor C and the output of the rectifier-converter, an output filter 122 coupled to an output of the H-bridge converter and having an output coupled to degaussing coil 104, and an H-bridge feedback controller 124 (referred to simply as a "controller" 124) coupled directly or indirectly to each of the aforementioned components.

Rectifier-converter 110 rectifies the 3-phase AC input power, and performs input power correction, to produce rectified DC power. The rectifier-converter 110 converts the rectified DC power to converted DC power, and performs galvanic isolation of power-out to power-in, to produce a DC input voltage Vdc for H-bridge converter 120 across terminals or input voltage rails 126A, 126B (collectively referred to as "input voltage rails 126"). A sample or measurement of input voltage Vdc is also provided to an input of controller 124.

H-bridge converter 120 includes current switches arranged in an H-matrix (i.e., a "switch matrix") and coupled to input voltage rails 126 (i.e., to/across input voltage Vdc) and to output voltage rails 106 (i.e., to degaussing coil 104). The current switches are shown in FIGS. 3, 4, 6, 7, and 9, described below. The current switches are configured to be turned ON and OFF selectively responsive to PWM signals 130 generated by controller 124. Responsive to PWM signals 130, H-bridge converter 120 (i.e., the switch matrix) may be controlled to operate in mutually exclusive modes, selectively, including a normal mode and a fault protection mode (also referred to simply as a "protection" mode), described below.

Controller 124 generates PWM signals 130 to control H-bridge converter 120 based on various inputs provided to the controller. To this end, degaussing system 100 includes, a voltage sensor 132V and a current sensor 132I coupled to output voltage rails 106 and that respectively measure/sense output voltage Vout and output current Tout, and provide the corresponding measurements to controller 124. Controller 124 receives a command 138 from a degauss control computer (not shown) that indicates a target reference current (e.g., AC or DC) to be supplied to degaussing coil 104 for a degaussing operation. Controller 124 may also receive, from the degauss control computer, a fault command 140 that indicates a fault condition, when such a condition occurs. The fault condition may be a true fault or failure, or simply a power-down condition. In addition, controller 124 receives a measurement of input voltage Vdc provided by rectifier-converter 110.

Responsive to the above-mentioned inputs, controller 124 selectively (i) generates/configures PWM signals 130 as square waves (or near square waves) to cause/compel H-bridge converter 120 to operate in the normal mode to energize degaussing coil 104 for a degaussing operation, or alternatively, (ii) generates/configures the PWM signals at constant, continuous levels to cause/compel the H-bridge converter to operate in the protection mode, after the normal mode, for example, to de-energize the degaussing coil safely, without additional external components used by conventional systems.

In an example, controller 124 controls or compels H-bridge converter 120 (and the controller itself) to operate in the normal mode by default when degaussing system 100 is turned on and a fault condition is not indicated by fault command 140. In the normal mode, controller 124 generates PWM signals 130 as the square waves (or near-square waves) with a controlled duty cycle that is always less than 100%. Responsive to square wave PWM signals 130, H-bridge converter 120 converts input voltage Vdc to low-frequency AC output power, including output current Tout and output voltage Vout, and provides the AC output power to output voltage rails 106 (i.e., and hence to opposing terminals/electrical contacts of degaussing coil 104) through output filter 122. Output filter 122 smooths ripples in output current Iout/output voltage Vout. Output current Iout flows into degaussing coil 104 to energize the degaussing coil for a degaussing operation.

More specifically, under control of square wave PWM signals 130 in the normal mode, first diagonal current switches and second diagonal current switches of the switch matrix of H-bridge converter 120 are periodically turned ON and OFF in a complementary fashion to supply output current Iout in alternating fashion from input voltage rails 126A, 126B to output voltage rails 106A, 106B, and hence into degaussing coil 104. In addition, controller 124 implements a feedback control loop to control output current Iout. Specifically, controller 124 (i) generates square wave PWM signals 130 with the controlled duty cycle to cause H-bridge converter 120 to generate output current Iout, such that the output current matches the reference current indicated by command 138, (ii) compares the output current measurement to the reference current, and (iii) when the compare indicates that the output current does not match the reference current, adjusts the duty cycle to drive the output current Iout closer to the reference current.

Provided that fault command 140 does not indicate the fault condition, controller 124 and H-bridge converter 120 continue to operate in the normal mode. When controller 124 receives fault command 140 indicating the fault condition (which may be a true failure condition or a power-down condition), the controller compels H-bridge converter 120 (and the controller itself) to operate in the protection mode. That is, controller 124 generates constant level PWM signals 130 configured for the protection mode to cause the H-bridge converter to operate in the protection mode. While in the protection mode, not all of the current switches of the H-bridge converter are turned OFF. Rather, controller 124 generates PWM signals 130 all with constant signal levels (i.e., signal levels that do not vary over time) that compel first and second mutually exclusive subsets of the current switches to continuously turn ON (at 100% duty cycle) and continuously turn OFF, respectively. For example, only upper current switches (or alternatively only lower current switches) of H-bridge converter 120 are continuously turned ON and only lower current switches (or alternatively only the upper current switches) of the H-bridge converter are continuously turned OFF.

While in the protection mode, H-bridge converter 120 (i) stops energizing degaussing coil 104 (i.e., stops supplying output current Iout from output voltage rails 106 to the degaussing coil), (ii) prevents high-level energy in the degaussing coil at the time the protection mode is entered from feeding back into other components of degaussing system 100, such as capacitor C, rectifier-converter 110, and a supply source of the 3-phase AC power input, and (iii) circulates all of the high-level energy only within the H-bridge converter and the degaussing coil, to permit the high-level energy to dissipate or decay toward zero, safely, i.e., without damaging components of degaussing system 100. In other words, H-bridge converter 120 safely de-energizes degaussing coil 104, and obviates the need for additional external energy absorption components employed by conventional solutions.

Figure 2:
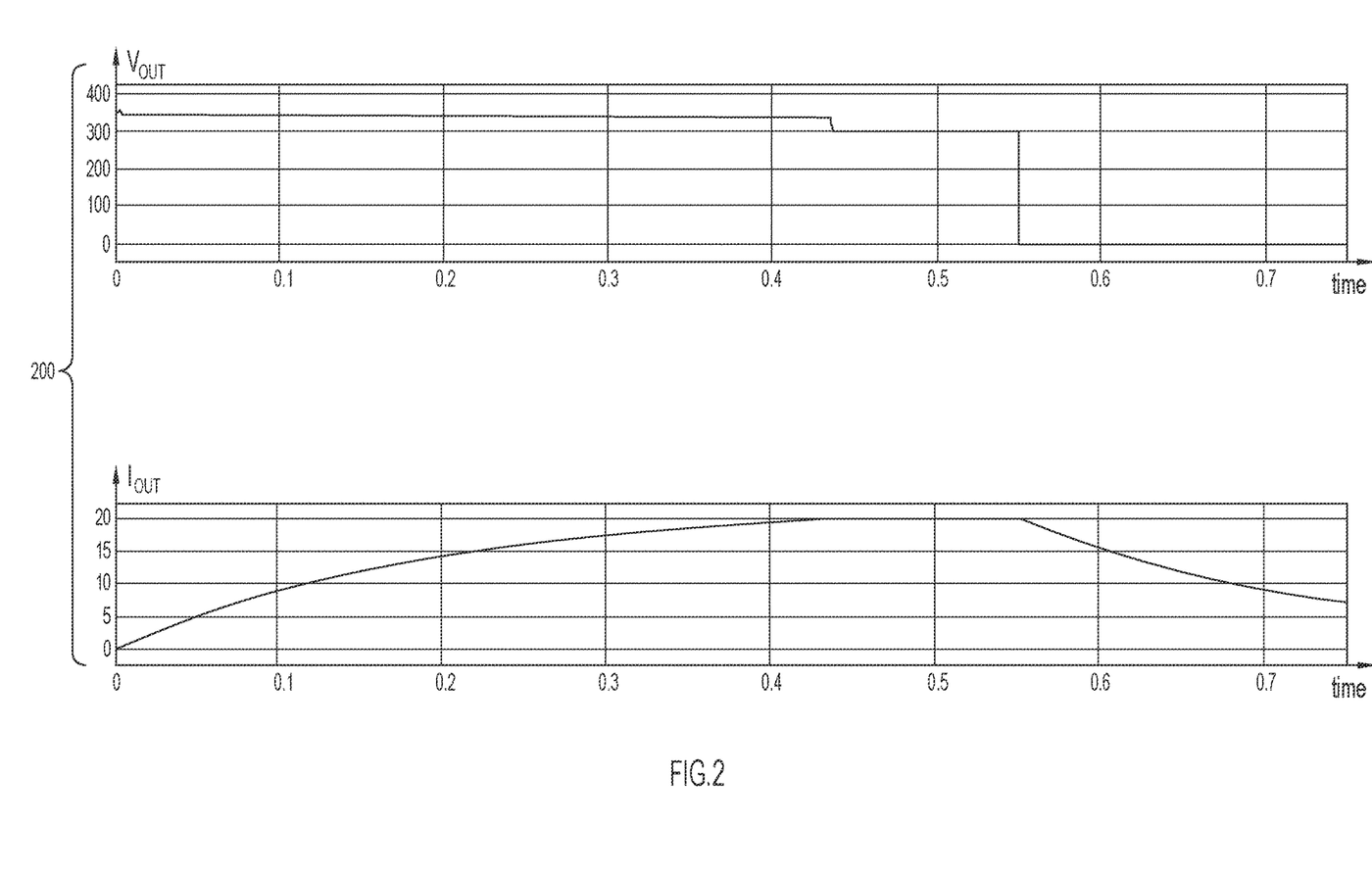
FIG. 2 shows example timing waveforms for output current (bottom waveform) and output voltage (top waveform) produced by an H-bridge converter of the degaussing system when operating in a normal mode and then a protection mode.

FIG. 2 shows example timing waveforms 200 for output current Iout (the bottom waveform) and output voltage Vout (the top waveform) when H-bridge converter 120 operates in the normal mode, and then transitions to the protection mode due to a fault condition, for example. The example of FIG. 2 assumes degaussing coil 104 (also referred to below as the "coil") has an inductance of 3 H and a resistance of 15Ω, although other values are possible. The waveforms are depicted over the following successive time segments:

a. For t=0 to 0.43 s, H-bridge converter 120 operates in the normal mode to impress full output voltage Vout=350 Vdc on the coil to bring the output current Iout (i.e., the coil current) to a reference current=20 A.

b. After t=0.43 s, H-bridge converter 120 continues to operate in the normal mode, and output current Iout catches up to/attains the target reference current, and output voltage Vout impressed on the degaussing coil by the H-bridge converter drops to 300V, which ensures the output current Iout matches the reference current=20 A.

c. At t=0.55 s, responsive to a fault condition, the H-bridge converter transitions from the normal mode to the protection mode under control of PWM signals 130 generated by controller 124. In the protection mode, not all of the current switches of H-bridge converter 120 are turned OFF. Rather, a first set of non-diagonal current switches (e.g., upper current switches) are continuously turned ON (at 100% duty cycle), while a second set of non-diagonal current switches (e.g., lower current switches) are continuously turned OFF. The switches in the first set of switches and the switches of the second switches are mutually exclusive switches.

In this configuration, all of the current flowing in the degaussing coil at the time the protection mode is entered free wheels in the degaussing coil and the H-bridge and safely decays to zero, without high-level oscillations. The protection mode prevents the occurrence of the high-level oscillations shown in FIG. 2.

Figure 3:
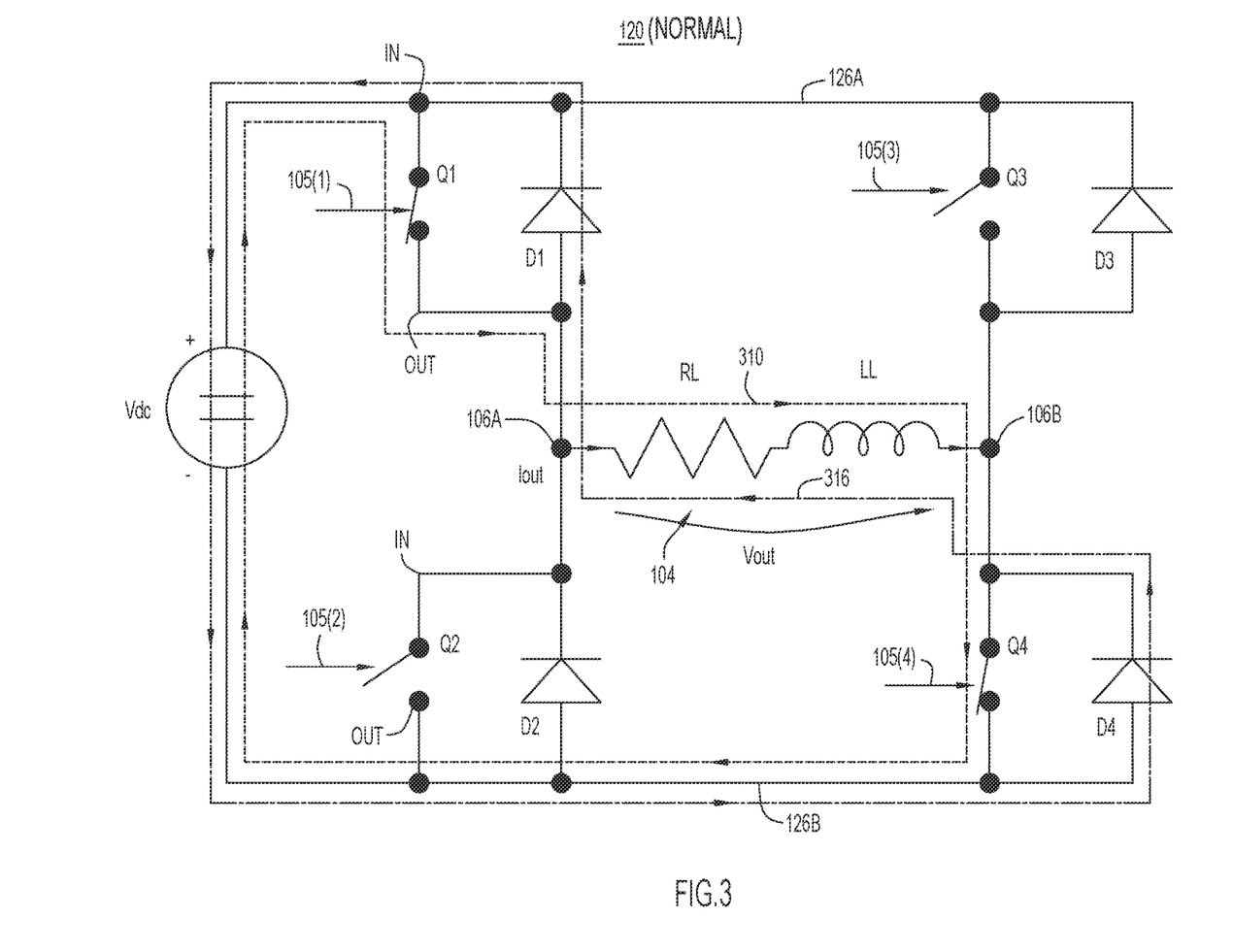
FIG. 3 is a high-level schematic and current flow diagram for an example of the H-bridge converter operating in the normal mode during a first half cycle of a square wave pulse width modulated (PWM) cycle.
Figure 4:
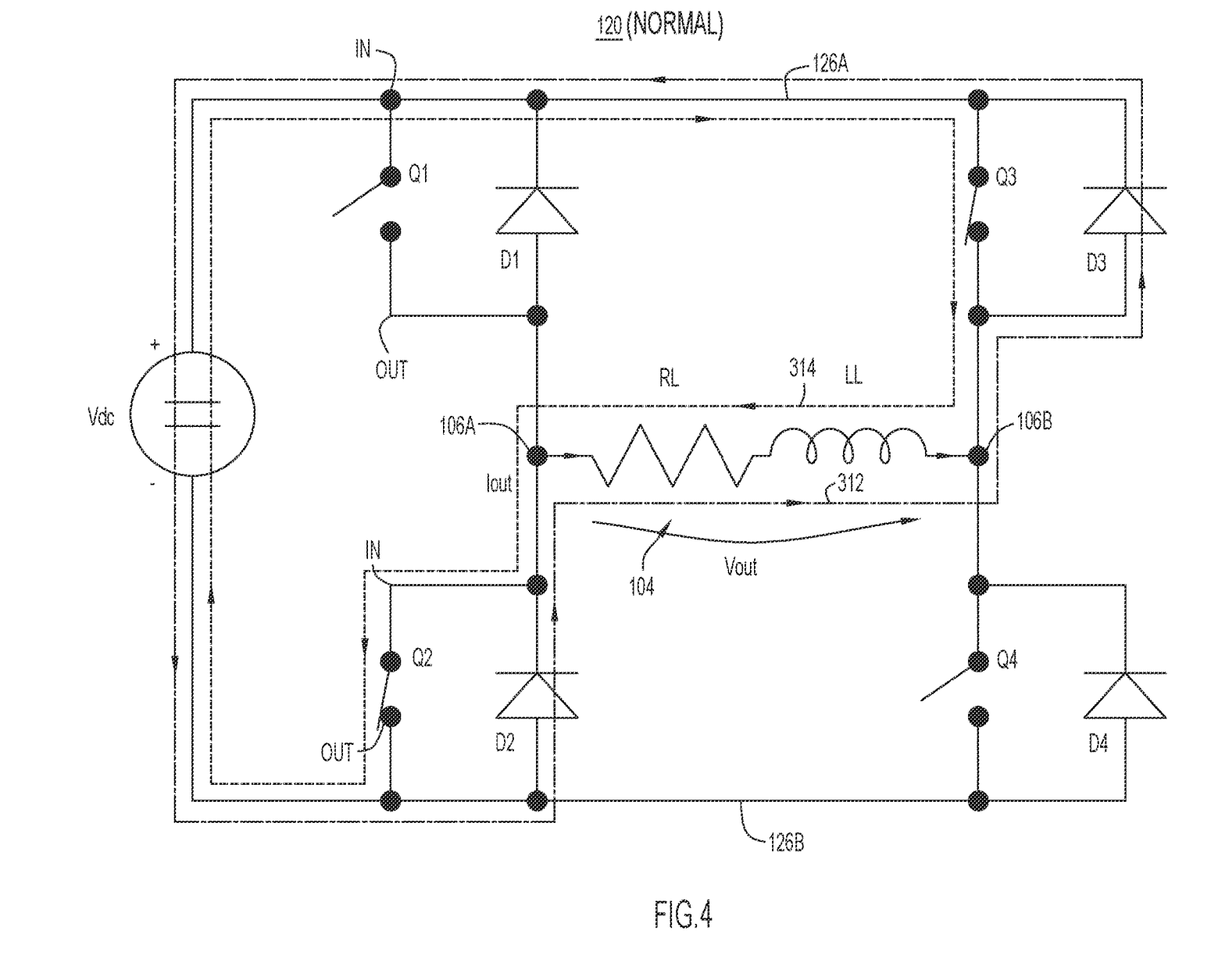
FIG. 4 is a high-level schematic and current flow diagram for the example H-bridge converter operating in the normal mode during a second half cycle of the square wave PWM cycle.
Figure 5:
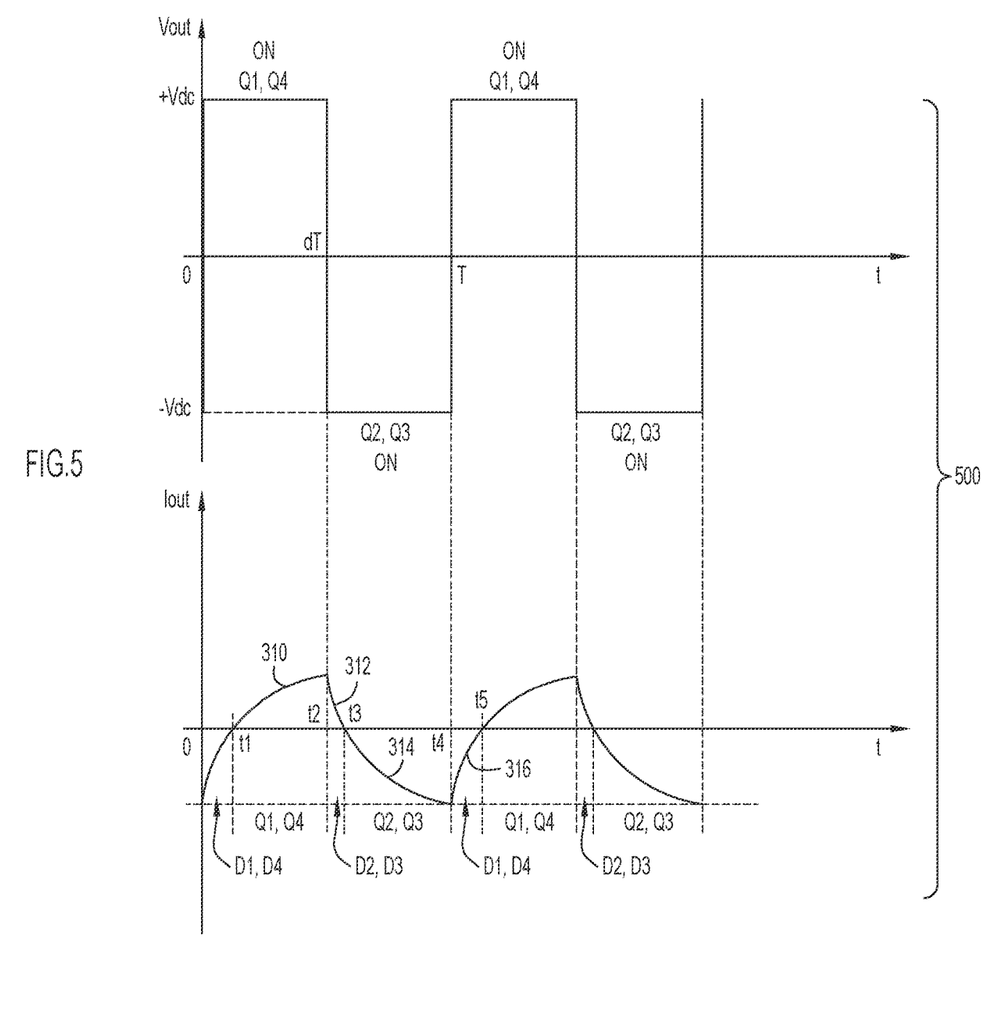
FIG. 5 shows example timing waveforms for output current (bottom waveform) and output voltage (top waveform) generated by the example H-bridge converter across the PWM cycle.

Detailed operation of H-bridge converter 120 in the normal mode is described in connection with FIGS. 3-5. FIG. 3 is a high-level schematic and current flow diagram for an example of H-bridge converter 120 as configured during a first half cycle of a square wave PWM cycle (described below). FIG. 4 is a high-level schematic and current flow diagram of H-bridge converter 120 as configured in a second half cycle of the PWM cycle. FIG. 5 shows example timing waveforms 500 for output current Iout (the bottom waveform) and output voltage Vout (the top waveform) generated by H-bridge converter 120 across the PWM cycle.

The main components of H-bridge converter 120 are described first with reference to FIG. 3. H-bridge converter 120 includes the H-matrix of current switches (referred to simply as "switches" in the ensuing description) coupled to opposing input voltage rails 126A, 126B (which serve as an input source to the H-bridge converter) and to degaussing coil 104 via output terminals/voltage rails 106A, 106B. Input voltage rails 126A, 126B receive input voltage+/−Vdc from rectifier-converter 110, such that input voltage rail 126A receives a positive voltage and input voltage rail 126B receives a negative voltage, i.e., serves as a return. The H-matrix has a pair of upper switches including an upper left switch Q1 and an upper right switch Q3, and has a pair of lower switches including a lower left switch Q2 and a lower right switch Q4. Switches Q1 and Q4 represent a first pair of diagonally opposed switches (referred to simply as "diagonal switches") and switches Q2 and Q3 represent a second pair of diagonal switches.

Each switch Qi includes an input, an output, and a control terminal to receive a respective one of PWM signals 105 (also referred to as "switch control signals" 105). For example, PWM signals 105(1)-105(4) of PWM signals 105 are respectively applied to the control terminals of (and thus control) switches Q1-Q4, as shown in FIG. 3. The PWM signals (and output filter 122) are omitted from FIG. 4 (and from FIGS. 6 and 7) for illustrative clarity, only. Each PWM signal 105(i) has (i) a first voltage state/level to turn ON corresponding switch Qi (i.e., to close the switch) to connect its input to its output so as to conduct current, and (ii) a second voltage state/level to turn OFF the corresponding switch (i.e., to open the switch) to disconnect its input from its output so as to block current.

Each switch Qi may be implemented as a switching transistor, such as a field effect transistor (FET) (e.g., a metal oxide semiconductor (MOS) FET (MOSFET)) having a source-drain current path that is turned ON or OFF responsive to a voltage applied to a gate (i.e., the control terminal) of the FET. Alternatively, each switch Qi may be implemented as an insulated gate bipolar transistor (IGBT). Other types of transistors may be employed. Complementary control voltages turn ON and OFF the transistor. For example, control voltages of +3.5V (high-level) and 0V (low-level, which is complementary to the high-level) may respectively turn ON and OFF a FET.

Upper switches Q1, Q3 have their respective inputs coupled to input voltage rail 126A (i.e., to +Vdc) and their respective outputs coupled to voltage rail 106A (i.e., a first terminal of degaussing coil 104) and input voltage rail 106B (i.e. a second terminal of the degaussing coil). Lower switches Q2, Q4 have their respective outputs coupled to input voltage rail 126B (i.e., to—Vdc/return) and their respective inputs coupled to the first terminal and the second terminal of degaussing coil 104. Thus, upper and lower left switches Q1, Q2 are connected in series to each other from input voltage rail 126A to input voltage rail 126B, and are connected to each other at the first terminal of degaussing coil 104. Similarly, upper and lower right switches Q3, Q4 are connected in series to each other from input voltage rail 126A to input voltage rail 126B, and are connected to each other at the second terminal of degaussing coil 104.

In addition, switches Q1-Q4 are configured with diodes D1-D4 respectively connected in parallel with the switches. Each diode Di includes an anode and a cathode connected to the output and the input of corresponding switch Qi. When switches Q1-Q4 are implemented as transistors, corresponding diodes D1-D4 may be implemented as internal diodes of the transistors.

For the normal mode, controller 124 generates square wave PWM signals 105 that all have the same duty cycle for a given PWM cycle or period, which repeats over time. Complementary PWM signals 105(1), 105(2) control switches Q1, Q2, which are therefore considered complementary switches, meaning that when one is turned ON, the other is turned OFF. Similarly, complementary PWM signals 105(3), 105(4) control switches Q3, Q4, which are also complementary. In addition, during the first half cycle of the PWM cycle (FIG. 3), PWM signals 105 simultaneously turn ON/close diagonal switches Q1 and Q4 and simultaneously turn OFF/open diagonal switches Q2 and Q3. During the second half cycle of the full PWM cycle (FIG. 4), PWM signals 105 PWM simultaneously turn OFF diagonal switches Q1 and Q4 and turn ON diagonal switches Q2 and Q3. The full PWM cycle repeats over time.

Normal mode operation during successive time segments (e.g., times t1-t2, t2-t3, and so on) shown on the timing diagram of FIG. 5 is now described also with reference to corresponding ones of FIGS. 3 and 4, as indicated below.

During time t1-t2, first half cycle, H-bridge converter 120 is configured as shown in FIG. 3:
 a. Q1, Q4—ON (first diagonal switches ON).
 b. Q2, Q3—OFF (second diagonal switches OFF).
 c. D1-D4—OFF (reverse biased).
 d. Clockwise current path 310 for Iout in FIG. 3. Iout flows from input voltage rails 126 to degaussing coil through first diagonal switches, only.
 e. Vout=Vdc, Iout rising.

During time t2-t3, second half cycle, H-bridge converter 120 is configured as shown in FIG. 4:
 a. Q1, Q4—OFF (first diagonal switches OFF).
 b. Q2, Q3 commanded ON (second diagonal switches ON) but not conducting (if IGBTs) or sharing current with diodes D2, D3 (if MOSFETs).
 c. D1, D4—OFF.
 d. D2, D3—ON.
 e. Counterclockwise current path 312 for Iout in FIG. 4. Iout flows from input voltage rails 126 to degaussing coil through ON diagonal diodes, only.
 f. Vout=−Vdc, Iout falling.

During time t3-t4, still in second half cycle, H-bridge converter 120 is configured as shown in FIG. 4:
 a. Q1, Q4—OFF.
 b. Q2, Q3—ON.
 c. D1-D4 are OFF (reverse biased).
 d. Clockwise current path 314 for Iout in FIG. 4.
 e. Vout=−Vdc, Iout falling.

During time t4-t5 (identical to interval t=0-t1), first half cycle, H-bridge converter 120 is configured as shown in FIG. 3:
 a. Q1, Q4 commanded ON but not conducting (if IGBTs) or sharing current with diodes D1, D4 (if MOSFETs).
 b. Q2, Q3—OFF.
 c. D1, D4—ON.
 d. D2, D3—OFF.
 e. Counterclockwise current path 316 for Iout in FIG. 3.
 f. Vout=Vdc, Iout rising.

By adjusting a duration dT of the first half cycle through a duty cycle d E [0, 1], controller 124 can change an average value and a polarity of output voltage Vout and output current Iout continuously.

Figure 6:
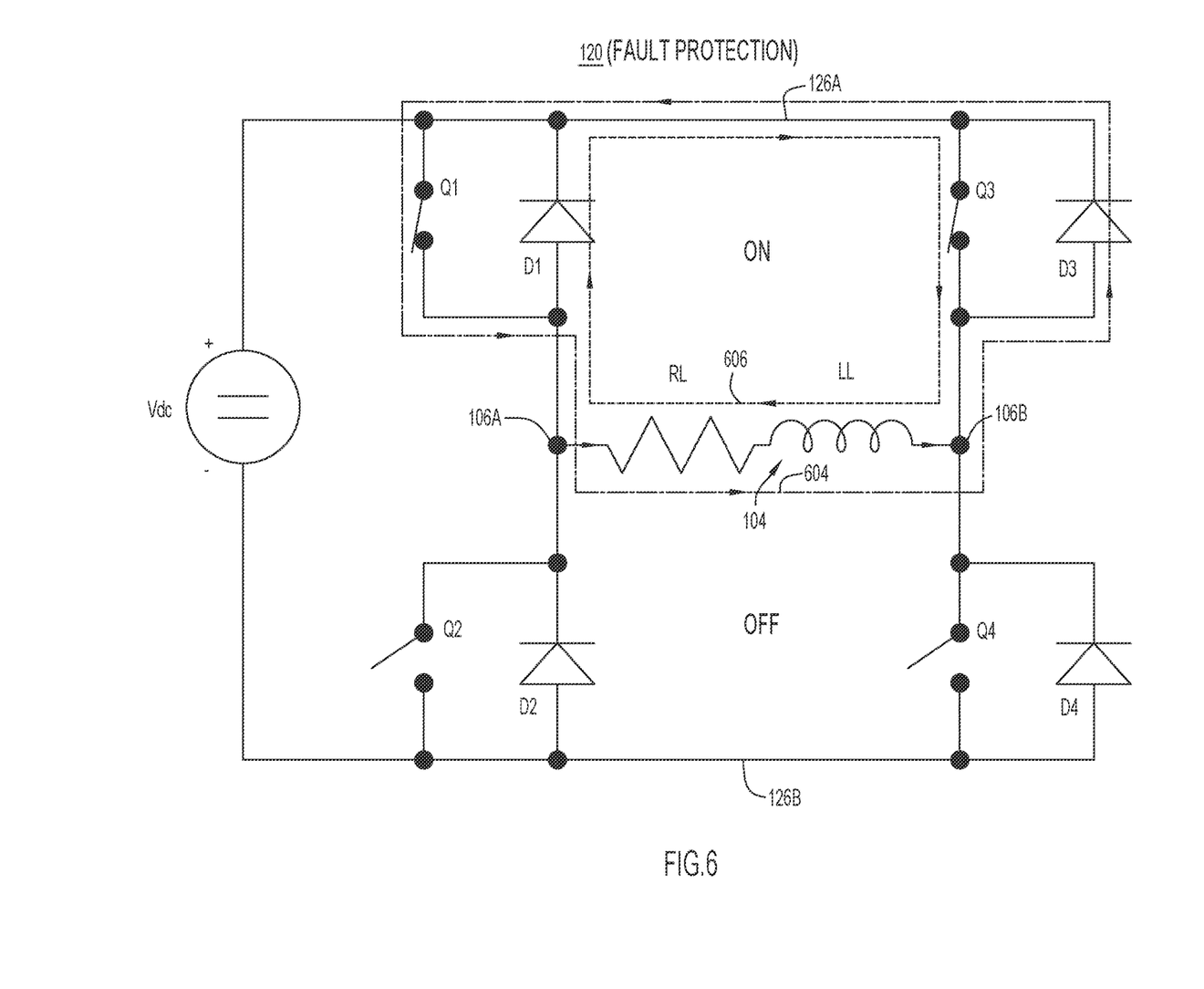
FIG. 6 is a schematic and current flow diagram for the example H-bridge converter when operating in the protection, according to a first embodiment.

Operation of H-bridge converter 120 in the protection mode is now described in connection with FIG. 6, which is a schematic and current flow diagram for H-bridge converter 120 when the H-bridge operates in the protection mode, according to a first embodiment. Responsive to constant level PWM signals 105 generated by controller 124 in the protection mode, upper switches Q1, Q3 are continuously (i.e., always) turned ON/closed at 100% duty cycle, to short circuit opposing terminals of degaussing coil 104 to input voltage rail 126A. Depending on the type of transistor used to implement upper switches Q1, Q3, the constant level may be a constant high-level (e.g., 3.5V) or a constant low-level (e.g., 0V) to turn ON the transistor. With upper switches Q1, Q3 turned ON, initial current existing in degaussing coil 104 at the time the protection mode is entered (i.e., "initial current" that was built up during previous normal mode operation) circulates/flow (i.e., to free wheel) through H-bridge converter 120 and the degaussing coil and decays smoothly to zero as energy in the degaussing coil is dissipated in the degaussing coil and the H-bridge.

When the initial current has a positive sense upon entry into the protection mode, the decaying current flows along (i) current path 604 in the counterclockwise direction, through switch Q1 and diode D3. When the initial current has a negative sense upon entry into the protection mode, the decaying current flows along current path 606 in the clockwise direction, through diode D1 and switch Q3.

Simultaneously with upper switches Q1, Q3 being continuously turned ON, lower switches Q2, Q4 are continuously turned OFF/opened to isolate degaussing coil 104 from input voltage rail 126B/−Vdc, which interrupts current flow from the input voltage rails into degaussing coil 104, and prevents an additional increase in the current in the degaussing coil. No current flows from degaussing coil 104 back into the input source/Vdc. Depending on the type of transistor used to implement lower switches Q2, Q4, the constant level may be a constant high-level (e.g., 3.5V) or a constant low-level (e.g., 0V) to turn OFF the transistor, and will generally be complementary to the level used to turn ON upper switches Q1, Q3. During the protection mode, diagonal switches are not ON at the same time.

Figure 7:
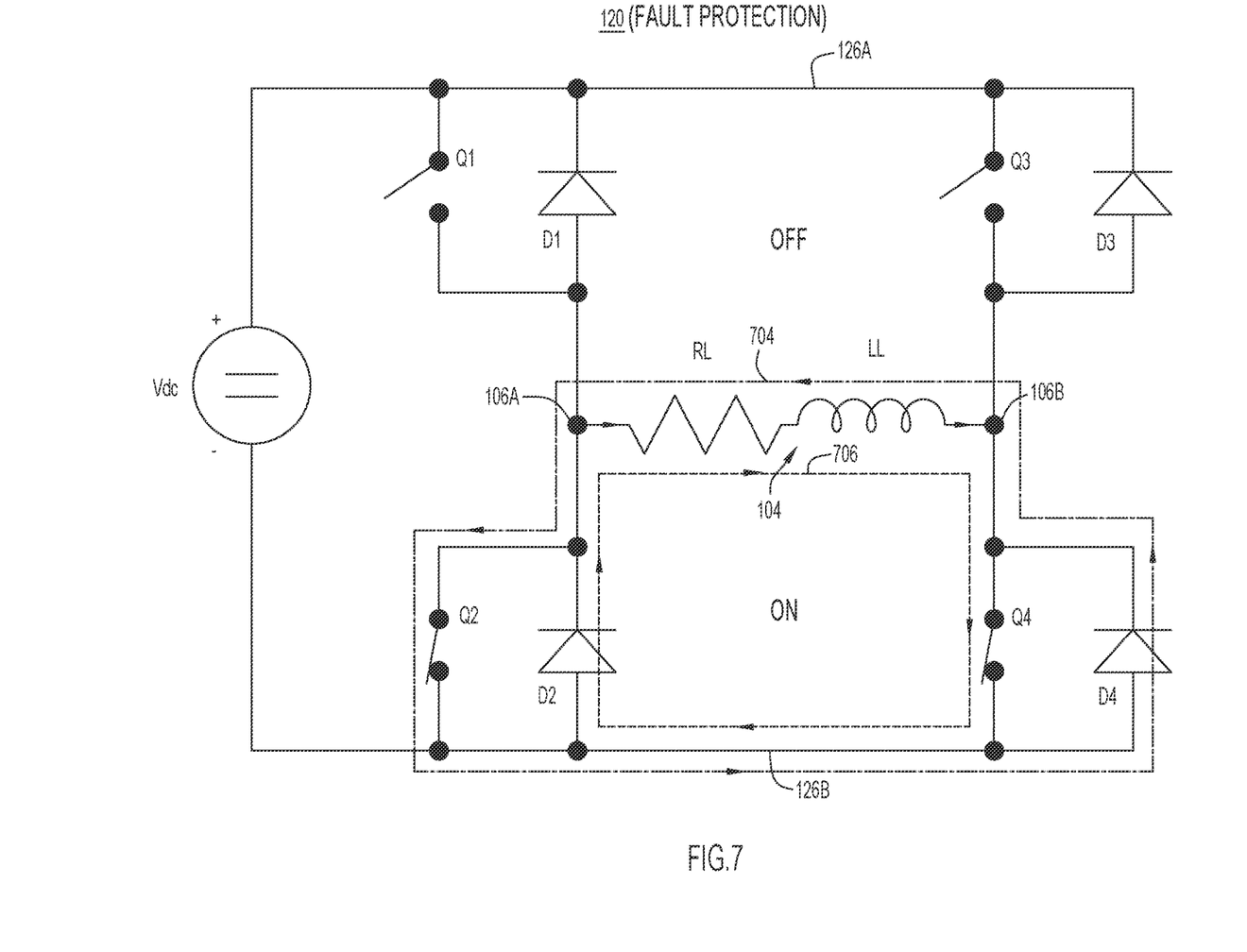
FIG. 7 is a schematic and current flow diagram for the example H-bridge converter when operating in the protection mode, according to a second embodiment.

FIG. 7 is a schematic and current flow diagram for H-bridge converter 120 when the H-bridge operates in the protection mode according to a second embodiment. The second embodiment is similar to the first embodiment, except that lower switches Q2, Q4 and upper switches Q1, Q3 switch roles. Thus, only lower switches Q2, Q4 are continuously turned ON, while only upper switches Q1, Q3 are continuously turned OFF. In this configuration, initial current present in degaussing coil 104 when the H-bridge enters the protection mode circulates/flows along (i) current path 704 in the counterclockwise direction when the current has a positive sense upon entry into the protection mode, or (ii) current path 706 in the clockwise direction when the current has a negative sense upon entry into the protection mode. The configuration of the second embodiment may be used as a switch-over or fail-safe configuration when switches Q1, Q3 are faulty, for example.

Figure 8:
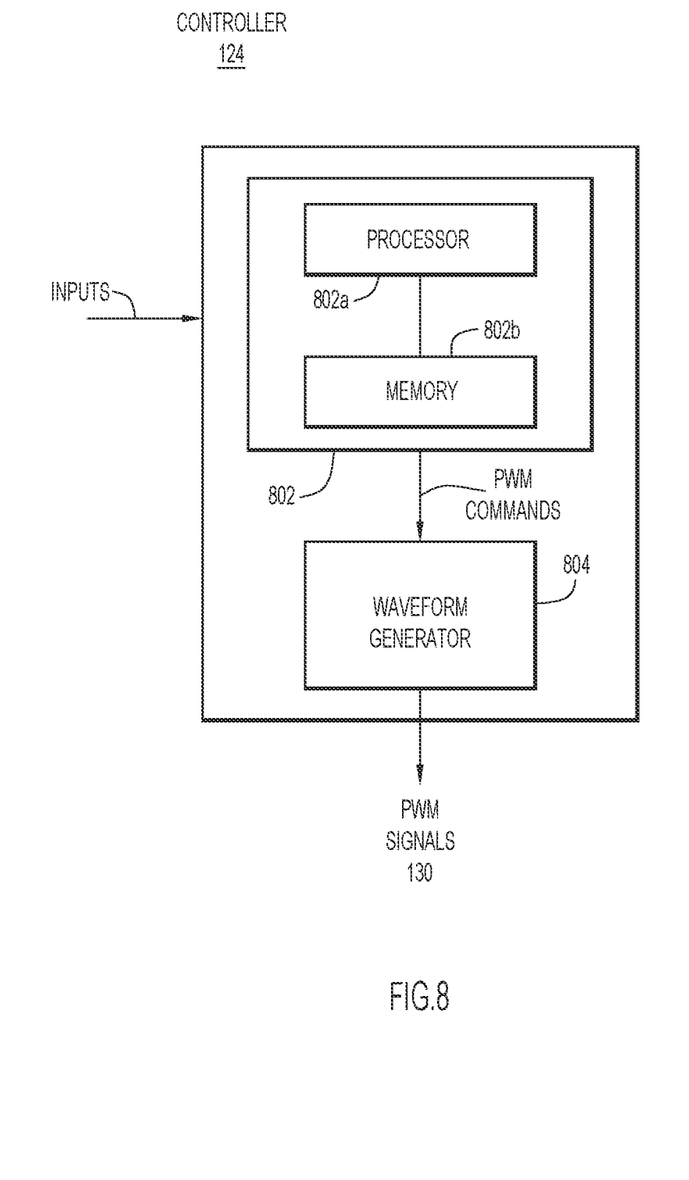
FIG. 8 is a high-level block diagram of an example controller of the degaussing system.

FIG. 8 is a high-level block diagram of an example of controller 124 according to an embodiment. Controller 124 includes a processor module 802 coupled to a waveform generator 804. Processor module 802 includes a processor 802a and a memory 802b. Processor module 802 receives various inputs, such as, but not limited to, commands 138, 140 and the measurements of output current Iout and output voltage Vout described above. Memory 802b stores control software instructions/control logic that, when executed by processor 802a, causes controller 124 to perform controller operations responsive to the inputs, as described herein. Processor 802a generates PWM commands, and provides them to waveform generator 804. Waveform generator 804 generates PWM signals 130 configured for the normal mode or configured for the protection mode responsive to the PWM commands. Waveform generator 804 may be configured as any known or hereafter developed waveform generator that generates PWM signals.

Figure 9:
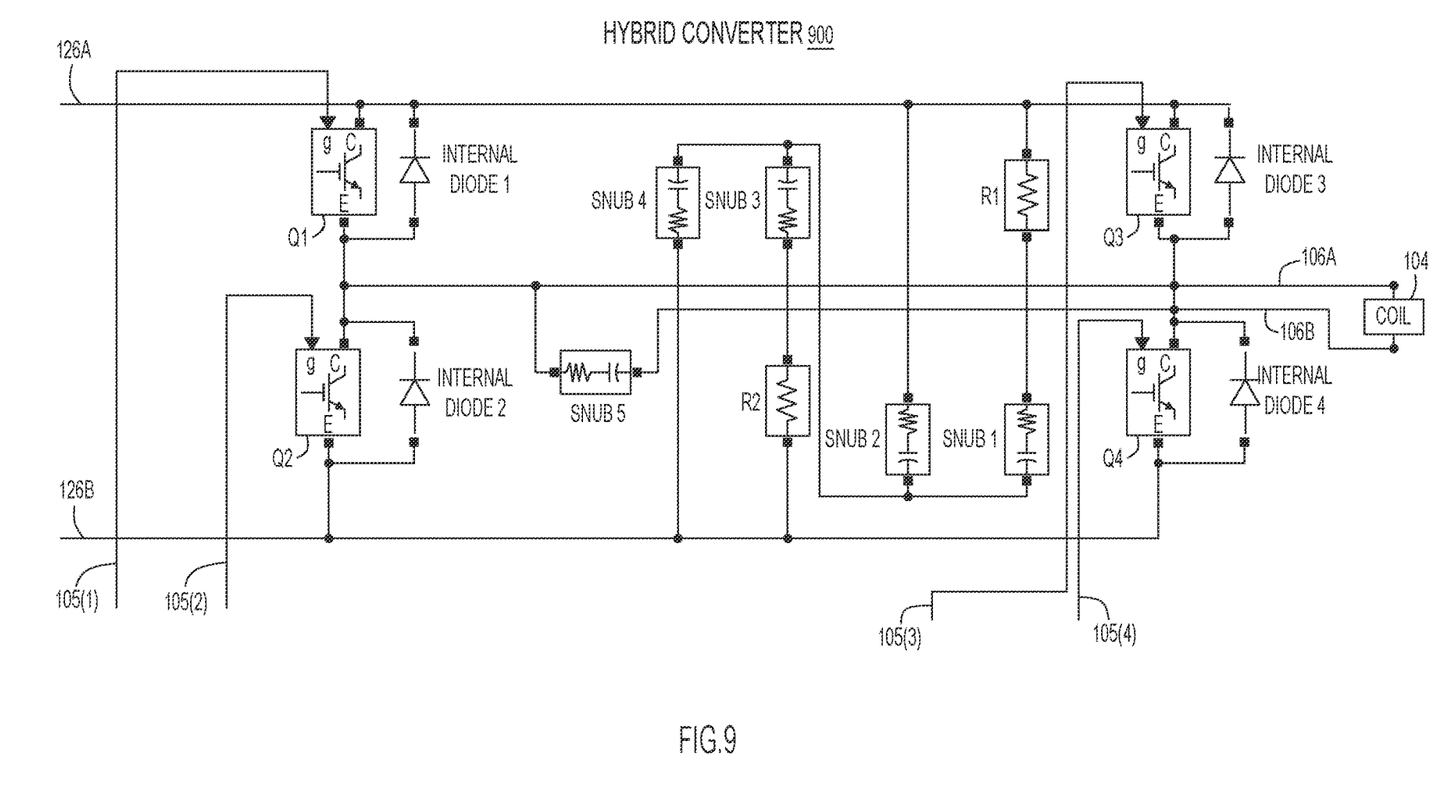
FIG. 9 is a circuit diagram of an example H-bridge converter implemented using insulated gate bipolar transistors (IGBTs) for current switches.

FIG. 9 is a circuit diagram of an example H-bridge converter 900 implemented using IGBTs for switches Q1-Q4. As shown in FIG. 9, H-bridge converter 900 includes snub circuits (i.e., "snubbers") snub1-snub5, and resistors R1 and R2, to suppress signal transients at various places in the H-bridge.

Figure 10:
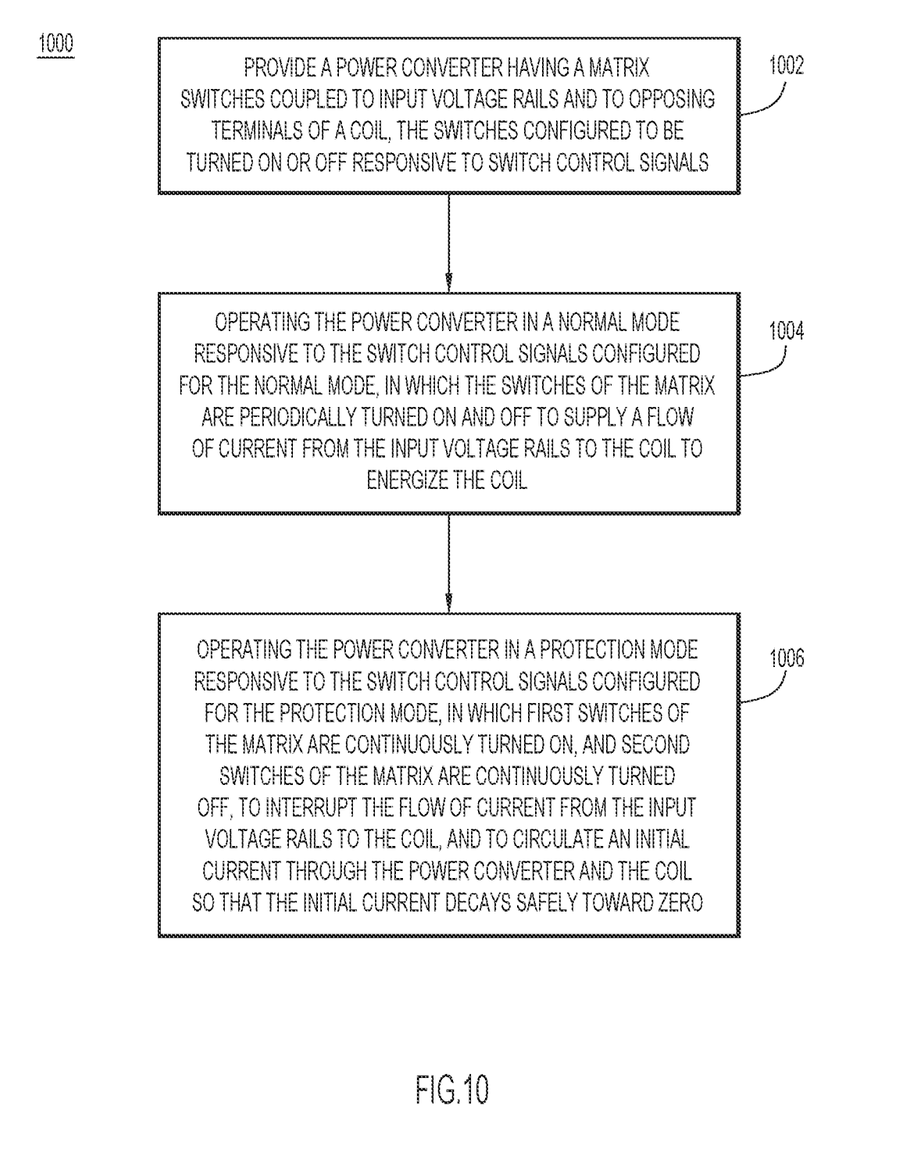
FIG. 10 is a flowchart of an example method of operating a power converter to perform energy load feedback dissipation without external energy dissipation circuitry in a degaussing environment.

FIG. 10 is a flowchart of an example method 1000 of operating a power converter (e.g., a DC-AC converter) to perform energy load feedback dissipation in a degaussing environment. In an example, method 1000 may be performed primarily by controller 124 and H-bridge converter 120, for example.

At 1002, the power converter (e.g., H-bridge converter 120) is provided. The power converter has a matrix of (current) switches coupled to input voltage rails (e.g., input voltage rails 126) and to opposing terminals (e.g., output voltage rails 106) of a coil to be energized. The switches are configured to be turned ON or OFF to conduct or block current, respectively, responsive to switch control signals (e.g., PWM signals) applied to the switches.

At 1004, in the absence of a fault condition, during a first time period, the method includes generating/configuring (e.g., by the controller) the switch control signals to compel the power converter to operate in a normal mode in which the switches are periodically turned ON and OFF with a duty cycle that is less than 100% to supply a flow of current from the input voltage rails to the coil to energize the coil. For example, first diagonal switches and second diagonal switches of the matrix are periodically turned ON and OFF in a complementary fashion to supply the flow of current from the input voltage rails to alternating ones of the opposing terminals of the coil.

At 1006, responsive to indication or detection of the fault condition, the method includes transitioning to/entering into a protection mode and, in the protection mode, generating/configuring (by the controller) the switch control signals to compel the power converter to operate in a protection mode, in which first switches (e.g., upper switches Q1, Q3/lower switches Q2, Q4) of the matrix are continuously turned ON, and second switches (e.g., lower switches/upper switches) of the matrix are continuously turned OFF, to interrupt the flow of current from the input voltage rails to the coil, and to circulate an initial current, flowing in the coil when the protection mode is entered, only through the power converter and the coil so that the initial current decays safely toward zero in those components, i.e., without additional energy dissipation components external to the DC-AC converter.

The embodiments have been described in the context of a degaussing environment by way of example, only. It is understood that the embodiments apply equally well to other environments that are not related to degaussing, e.g., applications in which a power converter energizes a coil and then is used to absorb feedback energy safely upon power-down of the power converter. Also, a power converter other than an AC-DC power converter or an H-bridge converter may be used in various embodiments for different applications.

In summary, in one aspect, an apparatus is provided comprising: a power converter having switches coupled to input voltage rails and to opposing terminals of a coil to be energized, the switches configured to be turned ON or OFF to conduct or block current, respectively, responsive to switch control signals; and a controller to generate the switch control signals to compel the power converter to selectively operate: in a normal mode in which the switches are periodically turned ON and OFF to supply current from the input voltage rails to the coil to energize the coil; and in a protection mode in which first switches of the switches are continuously turned ON, and second switches of the switches are continuously turned OFF, to interrupt the current from the input voltage rails, and to circulate an initial current, flowing in the coil when the protection mode is entered, through the power converter and the coil so that the initial current decays toward zero.

In another aspect, a method is provided comprising: providing a power converter having switches coupled to input voltage rails and to opposing terminals of a coil to be energized, the switches configured to be turned ON or OFF to conduct or block current, respectively, responsive to switch control signals; and generating the switch control signals to compel the power converter to perform: operating in a normal mode in which the switches are periodically turned ON and OFF to supply current from the input voltage rails to the coil to energize the coil; and operating in a protection mode in which first switches of the switches are continuously turned ON, and second switches of switches are continuously turned OFF, to interrupt the current from the input voltage rails, and to circulate an initial current, flowing in the coil when the protection mode is entered, through the power converter and the coil so that the initial current decays toward zero.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. An apparatus comprising:
a power converter having multiple switches coupled to input voltage rails and to opposing terminals of a coil to be energized, the multiple switches configured to be turned ON or OFF to conduct or block a current, respectively, responsive to switch control signals, wherein the coil includes a degaussing coil to generate a degaussing field responsive to the current; and
a controller to receive a fault command that indicates a failure condition or a power-down condition upon occurrence of the failure condition or the power-down condition, and to generate the switch control signals responsive in part to the fault command to compel the power converter to selectively operate:
when the fault command is not received, in a normal mode in which the multiple switches are periodically turned ON and OFF to supply the current from the input voltage rails to the coil to energize the coil; and
when the fault command is received, in a protection mode in which first switches of the multiple switches are continuously turned ON, and second switches of the multiple switches are continuously turned OFF, to interrupt the current from the input voltage rails, and to circulate an initial current, flowing in the coil when the protection mode is entered responsive to the fault command, through the power converter and the coil to cause the initial current to decay toward zero.

2. The apparatus of claim 1, wherein the power converter includes an H-bridge converter, and wherein:
in the normal mode, first diagonal switches and second diagonal switches of the multiple switches are periodically turned ON and OFF in a complementary fashion to supply the current from the input voltage rails to alternating ones of the opposing terminals of the coil; and
in the protection mode, one of an upper set of switches and a lower set of switches of the multiple switches are continuously turned ON, and an alternate one of the upper set of switches and the lower set of switches are continuously turned OFF, to interrupt the current, and to circulate the initial current through the H-bridge converter and the coil.

3. The apparatus of claim 2, wherein, in the protection mode, the one of the upper set of switches and the lower set of switches that are continuously turned ON short-circuit the opposing terminals of the coil to a first voltage rail of the input voltage rails.

4. The apparatus of claim 3, wherein, in the protection mode, the alternate one of the upper set of switches and the lower set of switches that are continuously turned OFF disconnect the opposing terminals of the coil from a second voltage rail of the input voltage rails.

5. The apparatus of claim 2, wherein:
the upper set of switches have respective inputs coupled to a first voltage rail of the input voltage rails and respective outputs coupled to the opposing terminals of the coil; and
the lower set of switches have respective inputs coupled to the opposing terminals of the coil and respective outputs coupled to a second voltage rail of the input voltage rails.

6. The apparatus of claim 2, wherein, in the protection mode, the upper set of switches are continuously turned ON and the lower set of switches are continuously turned OFF.

7. The apparatus of claim 2, wherein, in the protection mode, the upper set of switches are continuously turned OFF and the lower set of switches are continuously turned ON.

8. The apparatus of claim 1, wherein the multiple switches include switch transistors respectively having control terminals to receive the switch control signals and current paths configured to be turned ON or OFF responsive to the switch control signals.

9. The apparatus of claim 8, wherein the switch transistors include field effect transistors (FETs) or bipolar transistors.

10. The apparatus of claim 8, wherein the switch transistors are configured with corresponding internal diodes connected in parallel with corresponding ones of the current paths such that the initial current flows through the corresponding internal diodes or the current paths when the initial current circulates in a first direction or a second direction that is opposite to the first direction, respectively.

11. The apparatus of claim 1, further comprising one or more snubber circuits that are connected to the input voltage rails and a snubber circuit that is connected to the coil.

12. The apparatus of claim 1, wherein the current decays toward zero without employing additional circuit components external to the power converter.

13. A method comprising:
providing a power converter having multiple switches coupled to input voltage rails and to opposing terminals of a coil to be energized, the multiple switches configured to be turned ON or OFF to conduct or block a current, respectively, responsive to switch control signals, wherein the coil includes a degaussing coil to generate a degaussing field responsive to the current; and
by a controller, receiving a fault command that indicates a failure condition or a power-down condition upon occurrence of the failure condition or the power-down condition, and generating the switch control signals responsive in part to the fault command to compel the power converter to perform:
when the fault command is not received, operating in a normal mode in which the multiple switches are periodically turned ON and OFF to supply the current from the input voltage rails to the coil to energize the coil; and
when the fault command is received, operating in a protection mode in which first switches of the multiple switches are continuously turned ON, and second switches of the multiple switches are continuously turned OFF, to interrupt the current from the input voltage rails, and to circulate an initial current, flowing in the coil when the protection mode is entered responsive to the fault command, through the power converter and the coil to cause the initial current to decay toward zero.

14. The method of claim 13, wherein the power converter includes an H-bridge converter, and wherein:
in the normal mode, first diagonal switches and second diagonal switches of the multiple switches are periodically turned ON and OFF in a complementary fashion to supply the current from the input voltage rails to alternating ones of the opposing terminals of the coil; and in the protection mode, one of an upper set of switches and a lower set of switches of the multiple switches are continuously turned ON, and an alternate one of the upper set of switches and the lower set of switches are continuously turned OFF, to interrupt the current from the input voltage rails to the coil, and to circulate the initial current through the H-bridge converter and the coil.

15. The method of claim 14, wherein, when operating in the protection mode, the one of the upper set of switches and the lower set of switches that are continuously turned ON short-circuit the opposing terminals of the coil to a first voltage rail of the input voltage rails.

16. The method of claim 15, wherein, when operating in the protection mode, the alternate one of the upper set of switches and the lower set of switches that are continuously turned OFF disconnect the opposing terminals of the coil from a second voltage rail of the input voltage rails.

17. The method of claim 14, wherein:

the upper set of switches have respective inputs coupled to a first voltage rail of the input voltage rails and respective outputs coupled to the opposing terminals of the coil; and the lower set of switches have respective inputs coupled to the opposing terminals of the coil and respective outputs coupled to a second voltage rail of the input voltage rails.

18. The method of claim 14, wherein, when operating in the protection mode, the upper set of switches are continuously turned ON and the lower set of switches are continuously turned OFF.

19. The method of claim 14, wherein, when operating in the protection mode, the upper set of switches are continuously turned OFF and the lower set of switches are continuously turned ON.

20. The method of claim 14, further comprising operating in the normal mode and in the protection mode during first and second successive time periods, respectively.

* * * * *